United States Patent Office 2,881,057
Patented Apr. 7, 1959

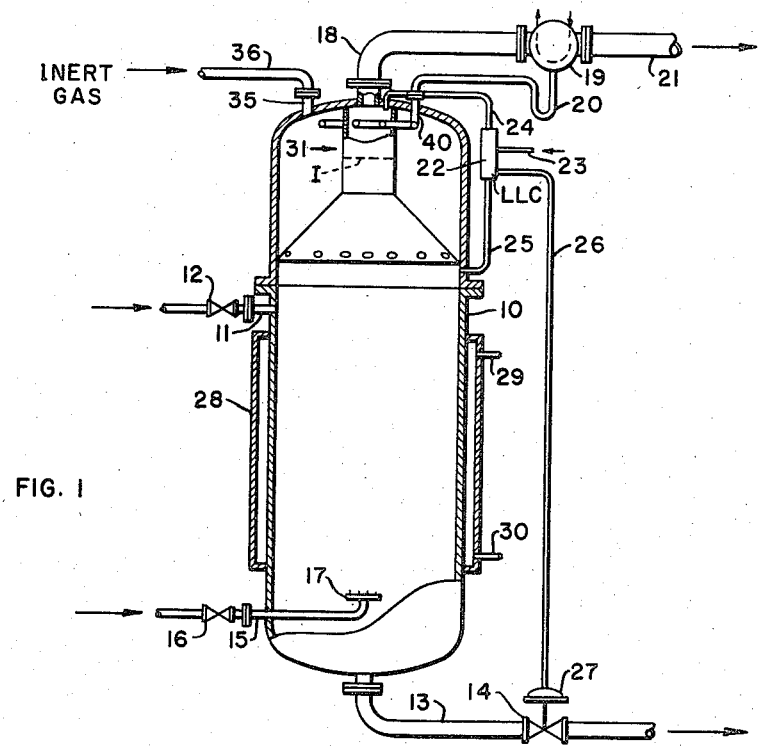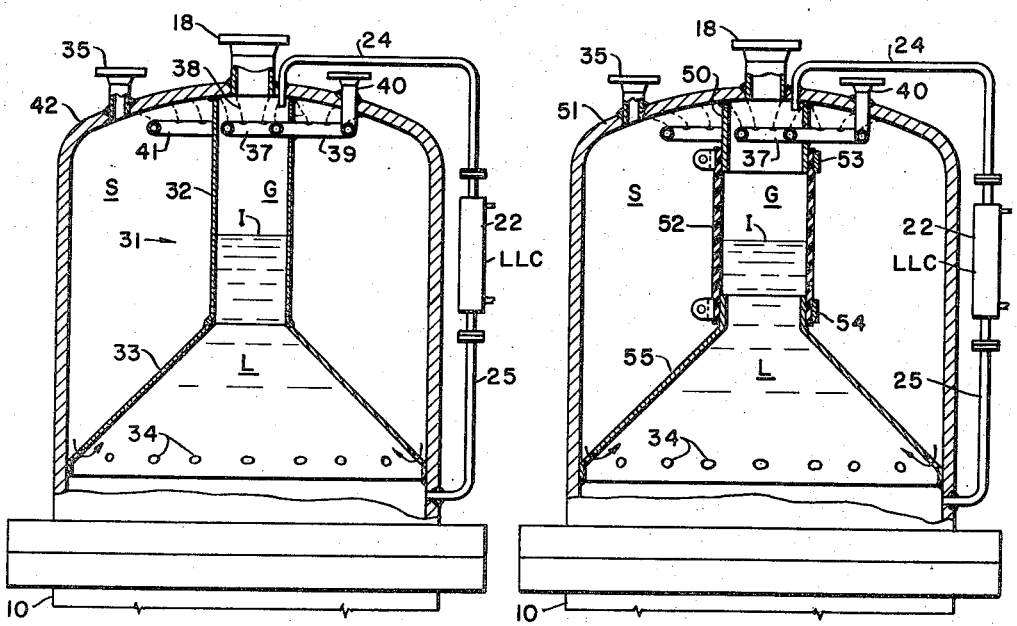

2,881,057

SAFETY VESSEL

Robert M. Cole, Oakland, Calif., assignor to Shell Development Company, New York, N.Y., a corporation of Delaware Application April 12, 1956, Serial No. 577,732

10 Claims. (Cl. 23—283)

This invention relates to safety vessels for containing a body of liquid and a body of gas in contact with one another, and is more particularly concerned with a partition structure adjoining the said body of gas for reducing or eliminating the hazard due to explosion of the gas. Such vessels find application, for example, as chemical reactors which are operated with a gas-liquid interface and wherein the body of gas is immediately or latently explosively dangerous. It is known to protect such vessels by various pressure relief arrangements including quick-opening valves or frangible walls which permit the contents of the vessel to be discharged freely to the open or into a duct upon the occurrence of a sudden overpressure. Such prior arrangements sought to prevent any pressure build-up within the vessel to the bursting pressure of the enclosing wall by a rapid discharge of a fraction of the contents. When applied to vessels of greater sizes such arrangements become increasingly costly and less dependable due to the large cross sectional area of the discharge passage required for the rapid venting of the contents and the need for providing means which insure the prompt opening of the discharge passage while avoiding premature venting; this leads to complex installations when the vessel is to be operated at a variety of pressures. The total discharge of the vessel's contents upon the opening of such a vent is apt to cause damage outside the vessel. Also, such discharge arrangements are at times insufficiently rapid in relieving the pressure; this leads to detonation, i.e., supersonic pressure waves, which results in pressures far greater than explosion pressure, e.g., 20 times the initial pressure.

It is an object of the invention to provide a simplified and dependable safety vessel of the type indicated in the opening paragraph hereof wherein the protection against failure is provided independently of any discharge passages and means for rapidly opening them to permit efflux of fluid from the vessel. Another object is to relieve the pressure without discharge from the vessel and so rapidly that detonation is avoided. Ancillary thereto, it is an object to provide an improved safety vessel which can be fabricated at a low cost.

The safety structure according to the invention is based on the premise that an explosion in the contents of the vessel will occur in the body of gas and on the observation that such an explosion produces a pressure rise to a peak pressure which is a more or less predictable multiple, usually five to ten, of the initial pressure (i.e., of the pressure prior to the explosion), depending upon the nature, condition, and composition of the gas. The invention operates on the principle that an expansion chamber within the enclosing vessel wall which has a sufficient volume in relation to that of the body of gas and is separated from the explosively hazardous body of gas by a yieldable partition, e.g., rupturable and/or elastically deformable, will permit the exploding gas to expand into the expansion chamber with a resultant reduction in the pressure to a value which depends mainly upon the explosion peak pressure ratio and upon the relative volumes of the body of gas and the expansion chamber; the final pressure depends in part also upon the initial pressure and composition of the gas in the expansion chamber. All or a part of the partition may be yieldable. In general, the volumetric ratio between the volume of the expansion chamber and that of the body of explosively hazardous gas exceeds unity, and higher values make it possible to design the enclosing vessel wall with correspondingly lower safety factors. The yieldable partition is advantageously shaped and arranged to restrict the body of gas above the liquid to a small volume, viz., by restricting the cross sectional area of the vessel at the top, whereby the desired volumetric ratio can be achieved while using an expansion chamber of reasonable dimensions.

By providing such a partition wall within and of a lower strength than the enclosing vessel wall the latter is afforded a factor of safety against failure due to explosions without the need to provide devices which must be opened rapidly for discharging fluid from the vessel and without the need for providing a receiver for such discharged fluid.

The expansion chamber may be filled with a gas which is inert in relation to the other contents of the vessel, herein for brevity called an inert gas. To gain the greatest benefit from the expansion into this chamber, the pressure of the inert gas should be kept low, that is, at a value that is less than, close to or only slightly greater than that of the body of explosively hazardous gas. In a preferred arrangement the expansion chamber is in communication through a restricted passageway with the body of liquid beneath the hazardous gas and inert gas is continuously admitted into the expansion chamber to maintain therein a slight overpressure equal to the pressure drop through the passageway, thereby continuously purging the expansion chamber.

A further feature of the invention, which is advantageous in certain uses, involves the provision of a spray arrangement for continuously washing the walls which confine the hazardous gas to prevent the accumulation of deposits which are prone to initiate an explosion.

The invention will be further described in detail with reference to the accompanying drawings forming a part of this specification and showing certain specific embodiments by way of example, wherein:

Figure 1 is an elevation view of a safety vessel constructed according to the invention, parts being shown in section;

Figure 2 is an enlarged vertical sectional view of the upper part of the vessel; and Figure 3 is a view similar to Figure 2 showing a modified construction.

Referring to Figures 1 and 2, 10 represents a cylindrical pressure vessel having suitable connections for feeding and discharging the materials to be reacted. In one specific application, a liquid feed stream, e.g., a lower aliphatic alcohol, such as aqueous isopropyl alcohol, is admitted under pressure through a liquid inlet 11 at an upper level under control of a valve 12 and the reacted liquid is discharged at the bottom through an outlet 13 at a rate controlled by a valve 14; gas, e.g., air for oxidizing the alcohol, is admitted near the bottom under pressure through a gas inlet 15 controlled by a valve 16 and is dispersed in the liquid by a sparger, such as a multi-orifice distributor 17. The gas is discharged at the top through an outlet 18 and passed through a condenser 19 wherein liquid is condensed and from which condensate is returned to the vessel via a reflux line 20, residual gas being discharged at 21 through a suitable back-pressure device, not shown. It is necessary to maintain the liquid level in the vessel below the top thereof to provide a disengaging space and prevent liquid from being carried by the gas through the outlet 18; for this reason the liquid level is maintained at a selected level I. This level may be maintained automatically by a liquid level controller 22 which receives operating air under pressure through a duct 23 and is connected by ducts 24 and 25 to points within the column in the vicinity of the level I. The controller has an output duct 26 in communication with a valve operator 27 which is connected to operate the valve 14. The vessel may be provided with a suitable temperature conditioning element, such as a jacket 28 through which a thermal fluid, e.g., steam, is circulated via pipes 29 and 30.

The body of gas G which is in contact with the body of liquid L at the interface I is in some instances subject to explosion, either of itself and/or due to the presence of constituents of the liquid, e.g., in the form of deposits which may form on the walls confining the gas body due to evaporation of volatile constituents of the liquid solution which collects on the wall due to splash or a change in the liquid level. Now in accordance with the invention the danger of rupturing the vessel 10 and the likelihood of an explosion due to such deposits are reduced by two separate expedients, which may be employed in combination.

Considering first the protection against rupture, there is provided a partition wall 31 which has a lower strength than the enclosing wall 10. The partition may be annular in shape, as shown; it includes a chimney 32 sealed at the top to the head 42, which forms the roof of the vessel, so as to communicate with the outlet 18, and a frusto-conical wall 33 extending outwardly and downwardly from the bottom of the chimney to the column wall and attached to the latter. The partition wall may be made of sheet metal or a resin. The wall 33 has a plurality of restricted openings 34 distributed about the periphery near the bottom. The wall 31 encloses the upper part of the principal chamber of the vessel, which has a smaller area than the lower part. The partition thus restricts the upper part of the liquid body L and the gas body G to a cross section which is small in relation to the cross sectional area of the vessel. The partition and column wall together define an annular expansion chamber S which is isolated from the gas body G by the chimney 32 and has a volume exceeding that of the gas body G, being, for example, five to ten times as great. The chamber S communicates by a nozzle 35 to a pipe 36 through which an inert gas, such as nitrogen, is continuously admitted at a pressure slightly in excess of that prevailing in the gas body G.

Considering next the optional protection against the formation of hazardous deposits, there is provided within the chimney 32 a spray device of suitable form to direct liquid against the head 42 all around the periphery of the outlet 18 and into the latter, if desired; this may take the form of an annular perforated pipe 37 emitting a spray 38 and connected by a pipe 39 and nozzle 40 to a source of liquid, such as the reflux line 20. A second annular perforated pipe 41 may also be mounted in the expansion chamber S and connected to the nozzle 40 for directing liquid sprays against the inner wall of the head 42, the vessel 10 and the outer wall of the chimney 32.

In operation, liquid consisting of or containing the reactant is admitted continuously or intermittently through the pipe 11 and the reacted liquid is discharged through the outlet 13 at a rate determined by the valve 14 to maintain the liquid level in the principal chamber at the interface I. Air admitted through the pipe 15 and sparger 17 ascends and is guided by the wall 33 to enter the chimney 32, within which it is disengaged from the liquid to form the body of gas G; it is continuously discharged through the outlet 18, condenser 19 and pipe 21. An inert gas is admitted through the nozzle 35 into the expansion chamber S to prevent any of the reactor contents from entering this chamber. The inert gas escapes through the openings 34 and the pressure drop through these openings results in a slightly higher pressure within the chamber S than within the liquid body at the level of the openings, the pressure within the gas body G being still lower by the small amount of the liquid head from the said level to that of the interface I. The escaping inert gas flows along the underside of the wall 33 and eventually becomes a part of the gas body G. By providing the openings 34 in the partitions structure below the interface I the gas body G is isolated from the expansion chamber S while the pressure in the latter varies automatically with the pressure of the reactor contents so as always to exceed it by a small amount. Such pressure variations would occur, for example, while starting up or shutting down the unit, as well as during operation. The danger of rupturing the weak partition due to unequal pressures on opposite sides thereof is thereby obviated, and it is not necessary to provide additional pressure-responsive devices for altering the pressure within the chamber S, as would be required were it completely isolated. The openings 34 may be omitted in certain cases, as for example, when the pressure within the reactor is sufficiently low to avoid the danger of premature rupture. The chamber S is then completely isolated and may be at atmospheric pressure or at any desired pressure which is preferably not greatly different from that prevailing in the principal chamber of the reactor.

Should an explosion occur within the gas body G it would tend to cause a peak explosition pressure equal to a predictable multiple of the initial pressure. By way of illustration, if the vessel were operated with an initial pressure in the gas body of 400 lbs. per sq. in. abs., and the gas body contains mainly air and inflammable organic compound, including hydrogen peroxide, an explosion not accompanied by detonation would cause a peak unrelieved pressure approximately 8.1 times the initial pressure, viz, about 3,240 lbs. per sq. inch. However, the partition 32 fails before such a pressure is reached and the exploding gas expands into the chamber S. When the volume of the expansion space S is five times that of the gas space G, contains nitrogen, and is maintained at an absolute pressure of 401 lbs. per sq. in., the final pressure is approximately 1,067 lbs. per sq. in. A static pressure of that magnitude can be withstood by the vessel wall 10 when designed for an operating pressure of 410 lbs. per sq. in. (the pressure at the bottom of the vessel) with a safety factor of about 2.6, which is less than that customarily employed in the design of such vessels.

Entry of explosively hazardous materials into the chamber S is largely prevented by the continuous flow of inert gas through the openings 34. Such liquid material as does enter is continuously washed out by the liquid from the spray pipe 41 and any gas is purged out by the inert gas.

A potential hazard may exist within the chimney in certain situations if liquid is splashed against the confining walls and concentrated by evaporation to a composition at which it can spontaneously burst into flame. The spray 38 continually wets the vessel head 42 and the liquid runs as a film along the chimney wall to minimize such vaporization and to prevent the accumulation of such deposits.

Referring to Figure 3, wherein like reference numbers denote parts corresponding to those previously described for Figures 1 and 2, there is shown a modified construction wherein a part of the partition is made of elastic material. The partition includes a chimney including an upper mounting ring 50 which is secured in sealed relation to the vessel head 51 in communication with the outlet 18 and a tube 52 of elastic material fixed thereto by a clamp ring 53. The tube 52 may be made of natural or synthetic rubber of a nature compatible with the vessel contents. The bottom of the tube is secured by a second clamp ring 54 to a frusto-conical bottom closure wall 55 containing the restricted apertures 34. Operation of this embodiment is as previously described with the difference that the partition is not necessarily ruptured; instead, in the event of an explosion the tube 52 would be expanded to occupy most of the expansion chamber S, returning subsequently to the position shown as a result of seepage of liquid through the openings 34.

In both embodiments shown the partition is annular so that the gas body G is situated at the center of the vessel in radially spaced relation to the outer enclosing wall 10; this construction is desirable for reducing pressure shock waves against the outer wall, because the explosion pressure wave must traverse the annular expansion chamber S before reaching the outer wall. However, this preferred arrangement is not in every case essential, and the invention in its broadest aspect includes other arrangements. It is, of course, not necessary that the entire partition wall be subject to failure.

Moreover, while condensate from the condenser 19 was used to form the spray issuing from the spray pipes 37 and 41, it is evident that other liquid, e.g., the feed from the pipe 11, can be used for this purpose.

I claim as my invention:

1. A closed safety vessel adapted to confine fluid under pressure and including an enclosing wall, partition means within the vessel dividing the vessel into a principal chamber and an expansion chamber which is substantially isolated from said principal chamber and adjoins the upper part thereof, said vessel containing within said principal chamber a body of liquid up to a level above the bottom of said partition means and a body of gas above and in contact with the said liquid and said expansion chamber containing a volume of another gas greater than the volume of said body of gas, said partition means including a part which separates the said body of gas from the other gas and having over an extended area a lower strength than the said enclosing wall, whereby said partition yields upon the occurrence of an explosion in said body of gas to permit expansion of the exploding gas into the expansion chamber and flow means for admitting said liquid to and discharging said liquid from said vessel.

2. A safety vessel according to claim 1 wherein said partition means consists essentially of a rigid wall which is rupturable throughout at least the major part of the area separating the said gas body from the expansion chamber to place said expansion space into free communication over an extended area with the space within the principal chamber occupied by said body of gas upon the occurrence of said explosion.

3. A safety vessel according to claim 1 wherein said partition means includes an elastic wall which is deformable into the expansion chamber to contract the volume of the expansion chamber and dilate the space within the principal chamber occupied by said body of gas upon the occurrence of said explosion.

4. A safety vessel according to claim 1 including a restricted flow passage establishing communication between said expansion chamber and the principal chamber at a level below the top of said body of liquid.

5. In combination with the safety vessel according to claim 4, means for admitting continuously to said expansion chamber a stream of said other gas at a pressure which exceeds by a small amount the pressure of the first-mentioned body of gas for efflux through said restricted passage into the principal chamber and an outlet for discharging gas from the top of said principal chamber.

6. In combination with the safety vessel according to claim 1, means in addition to said flow means for supplying liquid to the top of said vessel within said principal chamber for flow along the wall bounding said body of gas.

7. A safety vessel adapted to confine fluid under pressure and including an upright, tubular enclosing wall and top and bottom closures, partition means within the vessel dividing the vessel into a principal chamber and an expansion chamber which is substantially isolated from said principal chamber and adjoins the upper part thereof, said upper part having a cross sectional area small in relation to that of the lower part of the principal chamber, flow means for admitting and discharging liquid from said vessel, said flow means including control means for maintaining within said principal chamber a body of liquid up to a level above the bottom of said partition means but below the top of the vessel, so as to leave a gas-filled space above the liquid within said upper part, said expansion chamber having a volume greater than that of said gas-filled space, said partition means including a part which separates said gas-filled space from the expansion chamber and having over an extended area a strength lower than that of said enclosing wall, whereby said partition yields upon the occurrence of an explosion in said body of gas to permit expansion of the exploding gas into the expansion chamber.

8. A closed safety vessel adapted to confine fluid under pressure and including an enclosing wall, a partition within the vessel including an annular wall spaced inwardly from the upper part of the enclosing wall and a connecting wall extending from the lower part of said annular wall to the enclosing wall, for dividing the vessel into an annular expansion chamber adjoining said enclosing wall and a central chamber which forms with the lower part of the vessel a principal chamber adapted to contain liquid to a level above the bottom of said annular wall and a body of gas above and in contact with said liquid, the part of said principal chamber within said annular wall having a smaller cross sectional area than the lower part of said chamber and said annular expansion chamber being adapted to contain another gas, said annular wall having a lower strength than said enclosing wall, whereby said partition yields upon the occurrence of an explosion in the said body of gas to permit expansion thereof into the expansion chamber and flow means for admitting said liquid to and discharging said liquid from said vessel.

9. A closed safety vessel adapted to confine fluid under pressure and including an enclosing wall, a partition within the upper part of said vessel dividing the said upper part into an expansion chamber and a restricted chamber which forms with the lower part of the vessel a principal chamber adapted to contain liquid to a level above the bottom of the partition and a body of gas above and in contact with said liquid, said partition including a wall separating the bottom of the said expansion chamber from the principal chamber which slopes upwards into said restricted chamber, said sloping wall having a restricted opening therein and said partition having a lower strength than said enclosing wall, whereby said partition yields upon the occurrence of an explosion in the said body of gas to permit expansion thereof into the expansion chamber, means for admitting a gas continuously into said expansion chamber for efflux through said restricted opening and passage through said body of liquid along the underside of said sloping wall into said body of gas and outlet for discharging gas from the upper part of said principal chamber, and means for admitting liquid to and discharging liquid from said vessel.

10. A closed safety vessel adapted to confine fluid under pressure and having an enclosing wall which includes a cylindrical upright part within which are contained a body of liquid to a level below the top of the vessel and a body of gas above and in contact with the body of liquid, a partition in the upper part of the vessel including a chimney having a lower rupture strength than said enclosing wall, said chimney enclosing the upper part of said body of liquid and said body of gas within a column having a cross sectional area less than that of the vessel and defining between itself and said enclosing wall an annular expansion chamber which is isolated by said chimney from and has a greater volume than said body of gas, said partition including further a lower wall for said expansion chamber extending downwardly and outwardly from said chimney to the enclosing wall and having therein at a low part thereof at least one restricted opening, means for admitting a gas continuously into said expansion chamber for efflux through said opening and passage through said body of liquid along the underside of said lower wall and into the said body of gas, an outlet for discharging gas from the top of column, and means for admitting said liquid to and discharging said liquid from said vessel.

References Cited in the file of this patent

UNITED STATES PATENTS

| | | |
|---|---|---|
| 1,456,820 | Muchka | May 29, 1923 |
| 2,507,132 | Woodward | May 9, 1950 |
| 2,643,025 | Bell | June 23, 1953 |
| 2,761,472 | Harbich et al. | Sept. 4, 1956 |